United States Patent

[11] 3,610,768

| [72] | Inventor | Burton L. Cochran<br>North Canton, Ohio |
|---|---|---|
| [21] | Appl. No. | 814,360 |
| [22] | Filed | Apr. 8, 1969 |
| [45] | Patented | Oct. 5, 1971 |
| [73] | Assignee | The Warner & Swasey Company<br>Cleveland, Ohio |

[54] TREPANNING TOOL
6 Claims, 10 Drawing Figs.

[52] U.S. Cl. .................................................. 408/204,
125/20, 144/219, 175/403
[51] Int. Cl. .................................................. B23b 51/04
[50] Field of Search .......................................... 77/69;
144/219; 125/20; 175/403, 413

[56] References Cited
UNITED STATES PATENTS

| 3,430,526 | 3/1969 | Valenziano | 77/69 |
| 3,387,637 | 6/1968 | Ferguson et al. | 77/69 X |
| 3,308,689 | 3/1967 | MacDonald | 77/69 |
| 2,869,405 | 1/1959 | Wolfe | 77/69 |

Primary Examiner—Francis S. Husar
Attorney—Freeman & Taylor

ABSTRACT: A trepanning tool that is characterized by the provision of a cylindrical cutting head projecting coextensively from a shank that has an axis of rotation. Consumable cutting elements are releasably attached to the cutting head in axially projecting relationship therewith and these elements are also releasably secured against movement radially, circumferentially and axially of the cutting head. The tool also has a relieved wall section in the cutting head extending axially and circumferentially so as to provide a means of chip egress during the cutting operation.

PATENTED OCT 5 1971

INVENTOR.
BURTON L. COCHRAN
BY Freeman + Taylor
ATTORNEYS

PATENTED OCT 5 1971
3,610,768
SHEET 2 OF 2
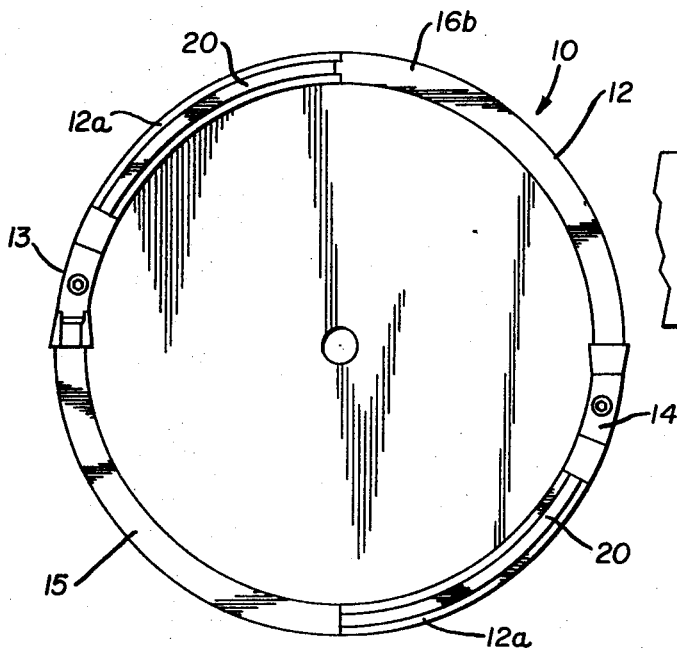
FIG. 5
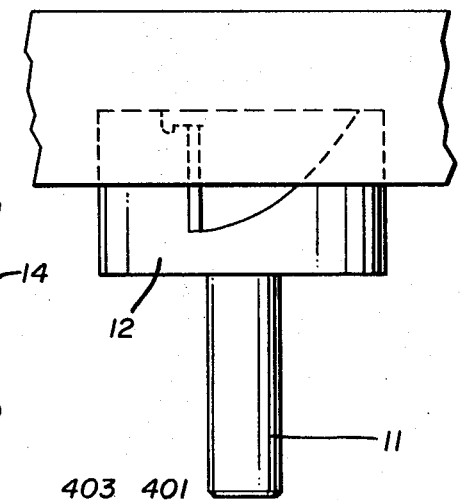
FIG. 6
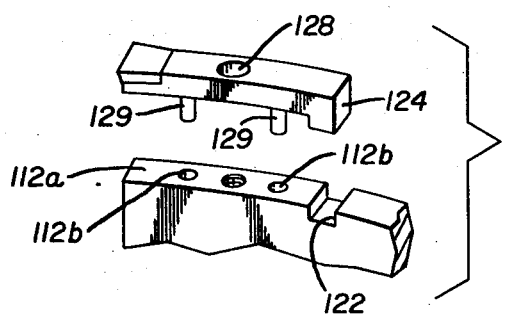
FIG. 7
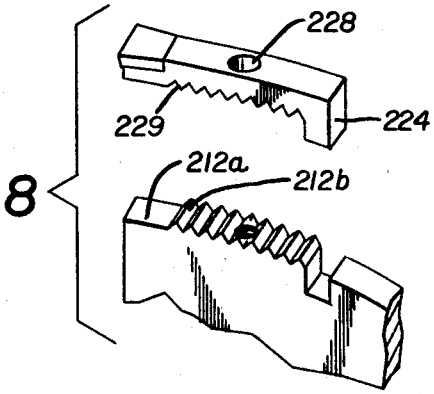
FIG. 10
FIG. 8
FIG. 9
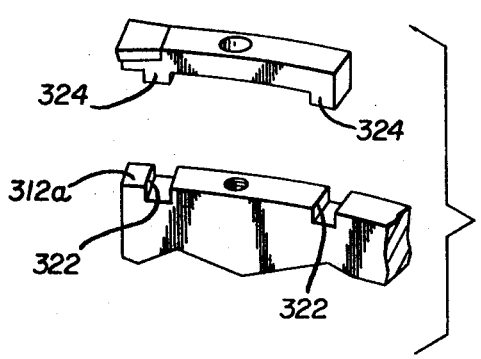
INVENTOR.
BURTON L. COCHRAN
BY
Freeman & Taylor
ATTORNEYS

TREPANNING TOOL

BACKGROUND OF THE INVENTION

1. Field of the Invention

The broad field of the invention may be generally described as metal working and, more specifically described as what is commonly called trepanning, which is a well-known form of metal working wherein cylindrical grooves are cut in a work piece. Trepanning operations can be executed either with the tool held in a fixed position and the workpiece rotated or vice versa.

2. Description of the Prior Art

The most pertinent prior art known to applicant is MacDonald U. S. Pat. No. 3,308,689 wherein a hollow barrel projects coextensively from a shank and has a radially enlarged head that carries detachable cutting bits 17,17. The apparent disadvantages that exist with regard to this tool may be summarized as follows:

1. A great deal of precision machining is required to mill the bit-receiving pockets in the proper configuration.
2. In chip removal excessive metal is wasted because of the necessity for using wide slots so as to facilitate chip removal with the material that is being removed being in effect wasted.
3. No provision exists for rework of the tool upon damage to the cutting portion thereof.

Other pertinent prior art patents known to Applicant are as follows:

| Williams | U.S. Pat. No. | 2,326,908 |
| Rosato et al. | U.S. Pat. No. | 2,863,341 |
| Wolfe | U.S. Pat. No. | 2,869,405 |
| Rosato et al. | U.S. Pat. No. | 2,870,836 |
| Aston | U.S. Pat. No. | 2,870,838 |
| Kleine | U.S. Pat. No. | 3,094,016 |
| Faber | U.S. Pat. No. | 3,274,863 |
| Theiler | U.S. Pat. No. | 3,351,998 |

In general, this prior art is characterized by attempting to break up the chips into small pieces in order to remove them. Also, the unique means for locating and supporting the cutting elements disclosed in this application are not shown. The advantages of the tool described herein will be described below.

SUMMARY OF THE INVENTION

First applicant provides a relatively inexpensive tool to manufacture by virtue of the cylindrical nature of the cutting component.

Second, the cost of manufacture is still further reduced while simultaneously effectuating an increase in efficiency by contouring the cutting unit so that it has, throughout its axial length, an arc of curvature that is presumably identical to the radius of the head per se. By this arrangement, not only is an efficient type of tongue and groove arrangement between head and cutting insert provided for radial interlock, but provision for reconditioning by enlarging of the head openings that are provided for chip clearance, in the event of damage to the tool, is also achieved.

A third advantage exists with respect to the provision of a carbide tipped cutting component that is secured against movement in three directions along what may be regarded as X, Y and Z axes.

A fourth advantage of the new construction may be regarded as the provision of new and improved chip egress openings that are provided in opposed relationship to each other on the tool body so as to facilitate chip removal while at the same time minimizing the width of cut so as to decrease the amount of stock removed during the trepanning operation.

A fifth advantage exists with respect to the improved concept of having opposed cutters provided with different cutting profiles so that the overall cutting force required may be divided into increments that are respectively opposed.

Accordingly, production of an improved trepanning tool having the above noted characteristics becomes the principal object of this invention with other objects thereof becoming apparent upon a reading of the following brief specification, considered and interpreted in view of the accompanying drawings.

OF THE DRAWINGS

FIG. 1 is a perspective view illustrating the improved trepanning tool in assembled condition.

FIGS. 2 and 3 are sectional views taken on the lines 2—2 and 3—3 of FIG. 1.

FIG. 5 is an end view of the improved tool.

FIG. 6 is a view showing the improved tool disposed in a vertical condition and partially inserted into the workpiece.

FIG. 7 is a view similar to FIG. 4 showing a modified trepanning tool.

FIG. 8 is a view similar to FIG. 4 showing another modified form of the invention.

FIG. 9 is a view similar to FIG. 4 showing another modified form of the invention.

FIG. 10 is a fragmentary view showing a still further modified form of the invention.

DETAILED DESCRIPTION OF THE INVENTION

Figure 1:
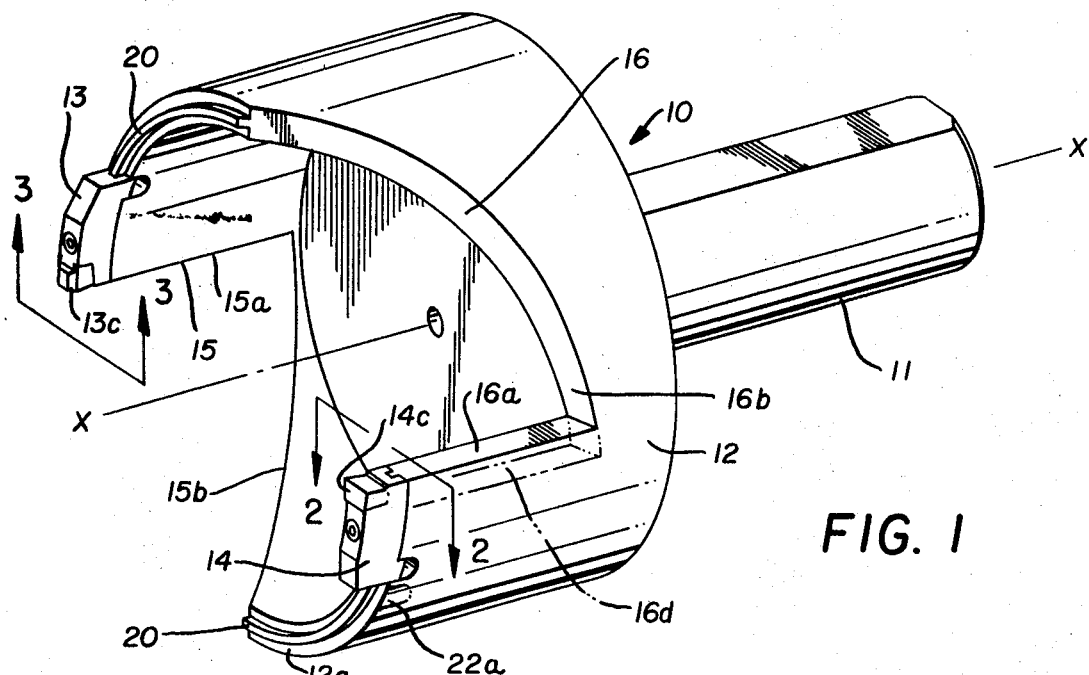

As indicated above, the improved trepanning tool, generally designated by the numeral 10, includes a shank 11 that has an axis of rotation X—X with cutting head 12 projecting coextensively from shank 11 so as to be rotatable around the axis of rotation X—X as is clearly apparent from FIG. 1 of the drawings. Opposed cutting bits or inserts 13 and 14 are detachably connected in axially projecting relationship to the cutting head 12 with the inserts 13 and 14 being respectively provided in trailing relationship to opposed recesses 15 and 16 that are provided for chip removal purposes.

Referring again to FIG. 1, the head 12 is generally cylindrical in configuration but the preferred form of the invention shown includes a circumferential rib 20 that extends in interrupted relationship along the forward edge of the head with the rib 20 projecting from face 12a of the head as is clearly shown in FIG. 1 of the drawings.

Figure 3:
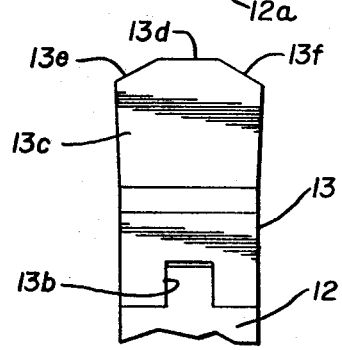
Figure 2:
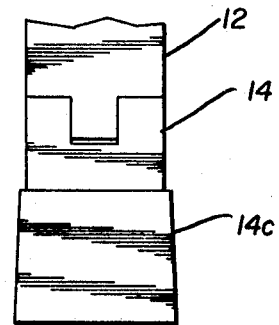
Figure 4:
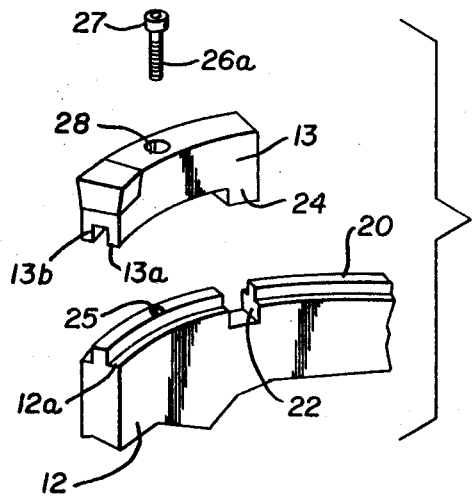
FIG. 4 is an exploded fragmentary view illustrating the relationship between head and tip in unassembled condition.

Referring next to FIG. 4, the exploded view, the face 12a of head 12 is undercut as at 22 so as to cooperatively engage a similarly shaped key portion 24 that depends from the bottom face 13a of insert 13 that in turn engages the rib 20 of head 12 as is clearly apparent from FIGS. 1, 2 and 3. The insert 14 also engages head 12 in this fashion as is also apparent from the drawings.

In this regard, while head 12 is shown having a projecting rib 20 which engages groove 13b, it should be understood that these parts could be reversed with the insert having a rib and the head having a mating groove.

It will be further noted that the pair of tapped openings 25,25 are provided in the rib 20 so as to receive the threaded portions 26a, 26a of bolts 27,27 with bolts 27,27 passing through the openings 28,28 that are provided in the inserts 12 and 13.

Again referring to FIGS. 1 and 4, for example, it will be noted that each of the cutting inserts 12 and 13 has carbide tip portions that are generally designated by the numerals 13c and 14c being different as is clearly illustrated in FIGS. 2 and 3. Specifically, and referring first to FIG. 3, it will be noted that there is a central cutting edge 13d and two relieved cutting edges 13e and 13f which taper away from edge 13d. By this arrangement, a central cut only is taken, with the width of this cut corresponding to the width of the surface 13d. Assuming that the cutting insert 14 follows the cutting insert 13 in point of contact, it will be noted that the unit 14 has completely transverse cutting surface 14d but it will be apparent that this surface 14d is not of the same dimension as the surface 13d and that cutting will occur only at the radially spaced edges that may be indicated by the numerals 14e and 14f. By this arrangement, each of the cutting elements 13 and 14 will absorb approximately onesorbed during the trepanning operation.

By virtue of the unique interconnection between inserts 13 and 14 and head 12, the cutting elements are securely held in place during operation. Thus the mating rib and groove connection resists radial forces while the fact that the inserts are fully supported on head 12 provides resistance to axial or feed forces. The main cutting force is resisted by the key connection 24, in groove 22, between the inserts and the head. Furthermore, the screws 27,27 will supplement all of the above noted improved support characteristics.

With reference to the relieved recesses 15 and 16 on head 12, the same are substantially identical in contour and opposed in relationship to each other with each recess including axially extending leading edges 15a, 16a as well as axially and circumferentially extending trailing edges 15b, 16b.

Preferably, the edges 15b and 16b taper rearwardly toward shank 11 as they progress from the inner surface of the head 12 to the external surface thereof with this arrangement facilitating chip removal.

With respect to chip removal and referring to FIG. 1, there is shown an imaginary plane of penetration similar to the plane of penetration shown in FIG. 6. Accordingly, the unit having penetrated axially to this extent, there is a void near the rear or bottom of the triangular unexposed portions of the recesses 15 and 16. With the rearward taper just described on the surfaces 15b and 16b, the chips that are created will in effect "boil out" through these openings. As further penetration occurs and assuming the openings 15 and 16 to be covered, it will be apparent that the area defined by the recesses 15 and 16 will in fact serve as a pickup reservoir for chips until such time as the trepanning operation has been completed to the requisite depth.

In the event of failure or damage to the head portion 12 of the tool, for example, it will merely be necessary to remove stock in the area indicated by the numeral 16d and at this time a new transverse slot 22a could be milled together with a new circumferentially spaced hole. At this time, the unit 14 could simply be reseated and operation of the tool could be resumed.

Turning next then to the modified form of the invention shown in FIG. 7, it will be noted that the insert itself has the same general overall configuration as inserts 13 and 14 including the key 124 and threaded opening 128. This form of the invention differs, however, in that the tongue and groove connection between the insert and the head 12 of the tool has been replaced by a pair of dowels 129,129 on the bottom of the insert and a pair of corresponding holes 112b,112b on the top surface 112a of the head. Assembly of the tool is accomplished in the same fashion as described above and it should be noted that the key 124 could be eliminated in this form of the invention if desired since dowels 129,129 serve the necessary support functions.

FIG. 8 shows a further modification in which complemental serrations 229 and 212b are disposed on the top of the head and the bottom of the insert.

FIG. 9 shows a still further modification in which a pair of keys 324,324 interlock with a pair of cutaway portions 322,322. It would be noted in particular with regard to the modification shown in FIGS. 7 and 9 that the parts could, of course, be reversed if desired. Thus, for example, the dowels could project upwardly from the leading edge 112a of the tool and the insert itself could have corresponding holes.

The modified form of the invention shown in FIG. 10 envisions a split type of insert 400 composed of a cutting element 401 and a clamping and support element 402 with a sliding tapered connection existing between these as shown in the drawings so that the unit 402 will effectively clamp the member 401 in place when bolt 404 is inserted within tapped opening 405. A similar bolt 403 serves to further hold down the front element which is provided with a carbide tip 408 as clearly shown in the drawings. The rib 409 fits within complemental groove provided on the underside of the units 401 and 402 and the front edge 406 is provided with requisite clearance angles as previously was the case. A transverse bore 407 permits the use of a metal plug that bears against the inserted screw 403 to thus retain the same in place during operation.

It will be seen from the foregoing how there has been provided a new and extremely simplified type of trepanning operation that is characterized by an improved tool of simplified design. It has been shown how this simplified design creates added utility in the trepanning tool by virtue of the fact that the same effectively locks the cutting elements against movement while simultaneously minimizing stock shift while trepanning occurs.

It should also be noted that while inserts 13 and 14 are shown as being carbide tipped, the same could also be of one piece, high-speed steel as well.

It will also be noted how the principles employed are capable of adaptations in fields other than trepanning with it being understood that an insert of this type could be utilized as a cutting tip that was supported on the support blade of conventional cutoff equipment and similarly, this could be used in circular saw construction as replaceable cutting tips.

Furthermore, while a cylindrical shank 11 has been shown, if the tool were used in a tool post only, only a partially cylindrical shank would be necessary.

While a full and complete description of the invention has been set forth in accordance with the dictates of the Patent Statutes, it should be understood that modifications can be resorted to without departing from the spirit hereof or the scope of the appended claims.

I claim:
1. A trepanning tool, comprising;
A. an elongate shank;
B. a cutting head
  1. of cylindrical configuration
  2. attached to and projecting coextensively from said shank and
C. first arcuate guide means
  1. projecting from and being concentric with the leading edge of said head;
D. second guide means extending generally transversely with respect to the thickness of the wall of said cutting head;
E. at least one cutting insert with a cutting edge on one end thereof releasably secured to said head in engagement with said first and second guide means; and
F. said cutting head having a generally triangularly shaped cutout wall portion associated with each said insert and having
  1. a first wall extending axially from said cutting edge toward the point of contact between said head and said shank
  2. A second wall extending from the end of said first wall toward said leading edge of said head.
2. A trepanning tool, comprising;
A. an elongate shank;
B. a cutting head
  1. of cylindrical configuration
  2. operatively associated with and projecting coextensively from said shank
  3. having at least one cutout wall portion that defines a cutting support surface at its point of engagement with the projecting end wall of said cylinder;
C. first guide means
  1. projecting from and being concentric with the projecting end of said head adjacent said cutting support point;
D. second guide means disposed on the projecting end of said head adjacent said first guide means;
E. at least one consumable cutting insert
  1. releasably secured to said head in projecting relationship therewith and in releasable engagement with said first guide means; and
F. at least on clamping element
  1. releasably secured to said head in projecting relationship therewith and
  2. in releasable engagement with said first and second guide means and
  3. overlying at least a portion of said insert.
3. A trepanning tool, comprising;
A. an elongate shank;
B. a cutting head
  1. of cylindrical configuration
  2. operatively associated with and projecting coextensively from said shank
  3. having at least one cutout wall portion that defines a cutting support surface at its point of engagement with the projecting end wall of said cylinder;
C. first guide means
  1. projecting from and being concentric with the projecting end of said head adjacent said cutting support point;
D. second guide means disposed on the projecting end of said head adjacent said first guide means;
E. at least one consumable cutting insert
  1. releasably secured to said head in projecting relationship therewith in releasable engagement with said first and second guide means;
F. said second guide means include a radial cutout area in the wall of said head; and
G. said insert having a complemental key thereon.
4. The device of claim 3 further characterized by the fact that said first guide means includes complemental serrations on said head and said insert.
5. The device of claim 3 further characterized by the fact that said first guide means include complemental pin and socket means disposed on said head and said insert.
6. The device of claim 5 further characterized by the fact that said second guide means include complemental pin and socket means disposed on said head and said insert.